(12) United States Patent
Shen

(10) Patent No.: US 10,209,920 B2
(45) Date of Patent: Feb. 19, 2019

(54) METHODS AND APPARATUSES FOR GENERATING MACHINE CODE FOR DRIVING AN EXECUTION UNIT

(71) Applicant: VIA Alliance Semiconductor Co., Ltd., Shanghai (CN)

(72) Inventor: Tian Shen, Shanghai (CN)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 281 days.

(21) Appl. No.: 15/141,776

(22) Filed: Apr. 28, 2016

(65) Prior Publication Data

US 2017/0153849 A1 Jun. 1, 2017

(30) Foreign Application Priority Data

Nov. 26, 2015 (CN) .......................... 2015 1 0836365

(51) Int. Cl.
*G06F 9/44* (2018.01)
*G06F 3/06* (2006.01)
*G06F 8/41* (2018.01)
*G06F 11/34* (2006.01)

(52) U.S. Cl.
CPC .......... *G06F 3/0653* (2013.01); *G06F 3/0604* (2013.01); *G06F 3/0638* (2013.01); *G06F 3/0673* (2013.01); *G06F 8/41* (2013.01); *G06F 9/44* (2013.01); *G06F 11/34* (2013.01)

(58) Field of Classification Search
CPC .................................................... G06F 3/0653
USPC ....................................................... 717/151
See application file for complete search history.

(56) References Cited

U.S. PATENT DOCUMENTS

| | | | | |
|---|---|---|---|---|
| 4,240,143 A | * | 12/1980 | Besemer | G06F 12/0284 710/104 |
| 4,814,982 A | * | 3/1989 | Weir | G06F 9/468 711/164 |
| 5,854,637 A | * | 12/1998 | Sturges | G06F 13/16 345/542 |
| 5,909,540 A | * | 6/1999 | Carter | G06F 9/5016 707/E17.12 |
| 6,105,129 A | * | 8/2000 | Meier | G06F 9/30036 712/222 |
| 6,148,361 A | * | 11/2000 | Carpenter | G06F 9/4812 710/260 |
| 6,167,338 A | * | 12/2000 | De Wille | G06F 8/654 701/51 |
| 6,247,084 B1 | * | 6/2001 | Apostol, Jr. | G06F 13/1684 710/100 |
| 6,347,346 B1 | * | 2/2002 | Taylor | H03K 19/1776 710/22 |
| 9,367,291 B2 | * | 6/2016 | Lee | G06F 8/40 |

(Continued)

FOREIGN PATENT DOCUMENTS

CN 104641350 A 5/2015

*Primary Examiner* — Evral E Bodden
(74) *Attorney, Agent, or Firm* — McClure, Qualey & Rodack, LLP

(57) ABSTRACT

A method for generating machine code for driving an execution unit is introduced to incorporate with at least the following steps: Data access instructions of a kernel, which are associated with the same memory surface, are collected. An address pattern associated with the data access instructions is analyzed to generate a global-id address. Machine code containing the global-id address is generated.

12 Claims, 5 Drawing Sheets

(56) References Cited

U.S. PATENT DOCUMENTS 9,442,706 B2 * 9/2016 Avkarogullari ....... G06F 8/4441
2001/0027512 A1 * 10/2001 Hagersten ........... G06F 11/0712
711/202

* cited by examiner

METHODS AND APPARATUSES FOR GENERATING MACHINE CODE FOR DRIVING AN EXECUTION UNIT

CROSS REFERENCE TO RELATED APPLICATIONS

This application claims the benefit of China Patent Application No. 201510836365.2, filed on Nov. 26, 2015, the entirety of which is incorporated by reference herein.

BACKGROUND

Technical Field

The present invention relates to GPU (Graphics Processing Unit), and in particular, it relates to methods and apparatuses for generating machine code for driving an execution unit.

Description of the Related Art

In a common GPGPU (General Purpose Graphics Processing Unit) model (such as OpenCL, render script, DX CS and OpenGL CS), most of the inputs and outputs are achieved by load, store, and sample operators to a memory. Improving the performance of the load, store, and sample actions is an important issue. Thus, methods and apparatuses for generating machine code for driving an execution unit are introduced to not only decrease the cost of the computation of memory addresses, but also to increase the hit ratio of cached data.

BRIEF SUMMARY

An embodiment of a method for generating machine code for driving an execution unit, performed by a compiler, contains at least the following steps. A method for generating machine code for driving an execution unit is introduced to be incorporated with at least the following steps: Data access instructions of a kernel, which are associated with the same memory surface, are collected; an address pattern associated with the data access instructions is analyzed to generate a global-id address; and machine code containing the global-id address is generated.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

Figure 1:
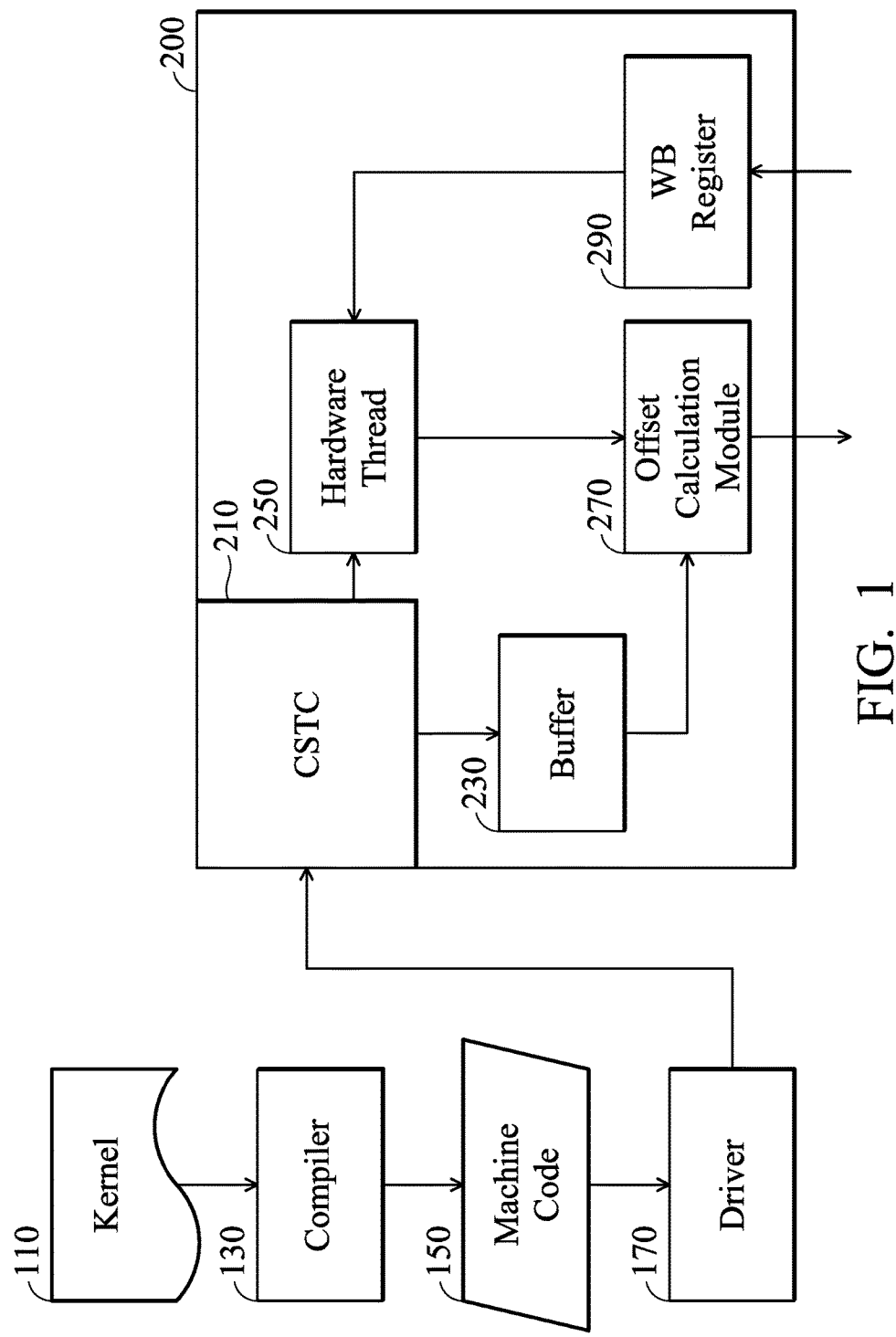
FIG. 1 is the hardware architecture of an apparatus for generating machine code for driving an execution unit according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In common GPGPU (General Purpose Graphics Processing Unit) model, a main function executed on device is named a kernel. The following is pseudo code of an exemplary kernel for combining two memory surfaces and outputting the results:

```
_kernel void VectorAdd (_global float4 * A, _global float4 *B, _global
float4 *C, int WidthA, int WidthB, int WidthC) {
    int x=get_global_id(0);
    int y=get_global_id(1);
    int addressA=(y+2)*WidthA+x+5;
    int addressB=(y+3)*WidthB+x+6;
    int addressC=y*WidthC+x;
    C[addressC]=A[addressA]+B[addressB];  }
```

Most addresses of load, store, and sample actions of the kernel are based on the global-ids, which are addressed in 2D/3D (two-dimensional/three-dimensional) space. In some implementations, a compiler calculates 1D (one-dimensional) addresses of load, store, and sample actions according to 2D/3D addresses and generates machine code with the calculated 1D addresses. The following shows exemplary machine code:

```
IMUL  R0, C[4], R0
IADD  R0, R4, R0
IADD  R0, C[7], R0  // x = get_global_id(0)
IMUL  R1, C[5], R1
IADD  R1, R5, R1
IADD  R1, C[8], R1  // y = get_global_id(1)
IADD  R2, R1, 2
IMUL  R2, CB[16], R2
IADD  R2, R2, R0   // (y +2) * WidthA + x;
IADD  R2, R2, 5    // (y +2) * WidthA + x + 5;
IADD  R2, C[13], R2<<4
LD    R4.xyzw, R2      //load data from A[addressA]
IADD  R3, R1, 3
IMUL  R3, C[17], R3
IADD  R3, R3, R0   // (y +3) * Width + x;
IADD  R3, R3, 6    // (y +3) * Width + x + 6;
IADD  R3, C[14], R3<<4
LD    R8.xyzw, R3 // load data from B[addressA]
FADD.rp3 R4, R4, R8    // A[addressA] + B[addressB]
IMUL  R1, C[18], R1
IADD  R1, R1, R0   // y * Width + x;
IADD  R1, C[15], R1<<4
ST    R4.xyzw, R1 // store data into C[addressC]
```

IMUL indicates the operator of integer multiplication, IADD indicates the operator of integer addition, FADD indicates the operator of floating point addition, LD indicates the operator of data loading and ST indicates the operator of data storing. The calculated memory addresses are sent to an execution unit for accessing data. However, the compiled machine code performs excessive calculations for memory addresses.

FIG. 1 is the hardware architecture of an apparatus for generating machine code for driving an execution unit according to an embodiment of the invention. The compiler 130 collects attributes of each memory surface, which indicates data of a range of memory addresses. Specifically, the compiler 130 scans the content of the kernel 110 to obtain data access instructions associated with the same range of memory addresses (i.e. the same memory surface). The compiler 130 analyzes data types of variables of the collected data access instructions to determine whether the memory surface is read only and whether the memory surface is a type buffer or image. The compiler 130 further determines whether the data types of variables of one data access instruction are supported data types. If not, the original instruction is modified with an instruction for dealing with variables with data types, which are supported by the EU (Execution Unit) 200. The compiler 130 further analyzes address calculation processes of the collected instructions to generate global-id addresses. Finally, the compiler 130 generates machine code (so-called binary code) 150 according to information indicating whether the memory surface is read only and whether the memory surface is a type buffer or image, the original and/or modified instructions, and the original and/or modified memory addresses. The driver 170 sets proper registers according to the loaded machine code 150 to drive the EU 200 to complete designated operations. The EU 200 is an execute unit for a compute shader and/or an 3D graphics shader (such as, Vertex Shader, Hull Shader, Domain Shader, Geometry Shader and Pixel Shader) in pipeline. The driver 170 can be implemented in numerous ways, such as with dedicated hardware, or with general-purpose hardware (e.g., a single processor, multiple processors or graphics processing units capable of parallel computations, or others) that is programmed using the machine code 150 to perform the functions recited herein.

Figure 2:
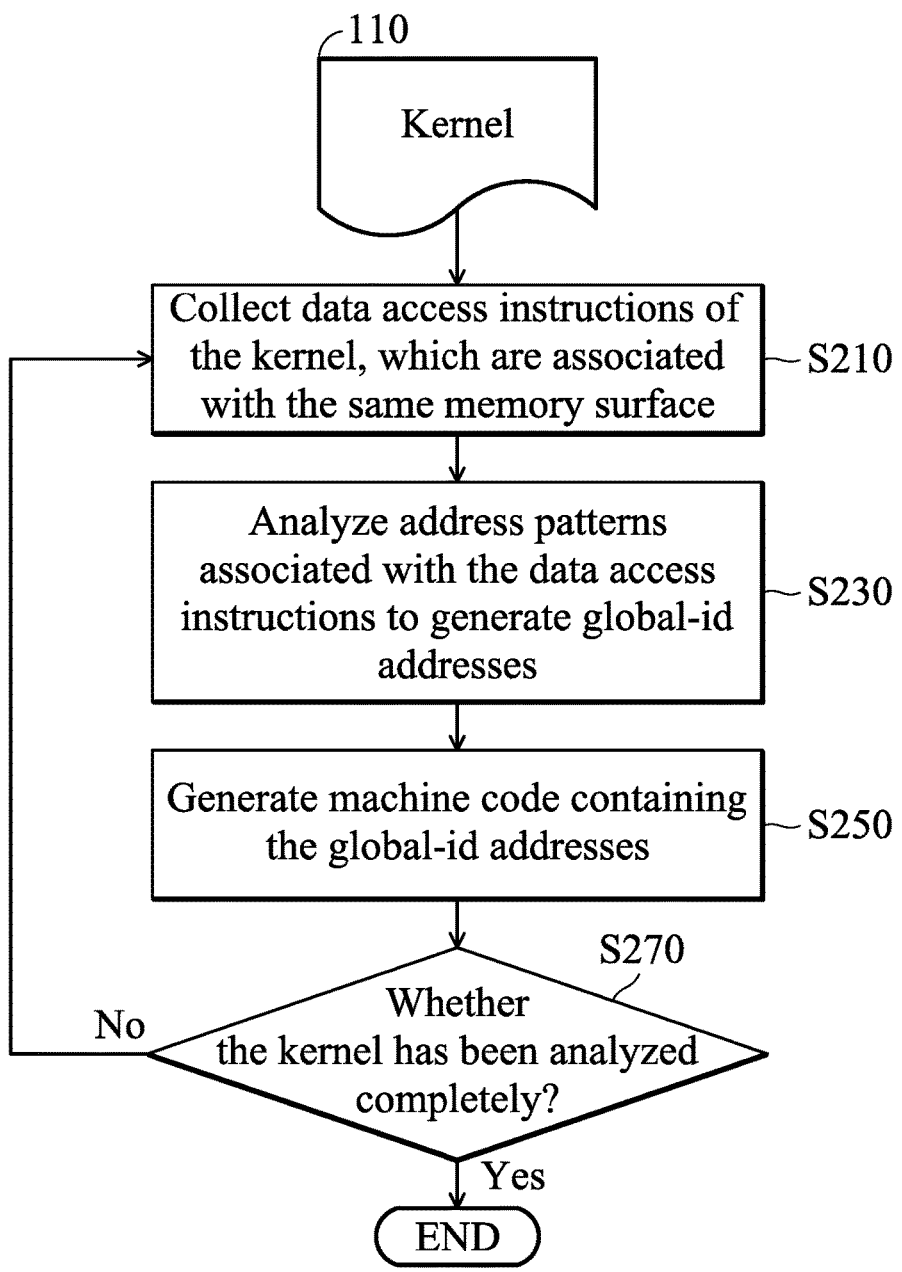
FIG. 2 is a flowchart illustrating a method for generating machine code for driving an execution unit according to an embodiment of the invention.

FIG. 2 is a flowchart illustrating a method for generating machine code for driving an execution unit according to an embodiment of the invention. The method is performed by the compiler 130. The compiler 130 repeatedly performs a loop for generating machine code 150 of load, store, reduction, and sample instructions associated with each memory surface, where the memory addresses of the instructions are global-id addresses. In each iteration, the compiler 130 collects data access instructions of the kernel 110, which are associated with the same memory surface (step S210). The memory surface may indicate data of a range of memory addresses. Next, address patterns associated with the data access instructions are analyzed to generate global-id addresses (step S230) and the machine code 150 containing the global-id addresses are generated (step S250).

Figure 3A:
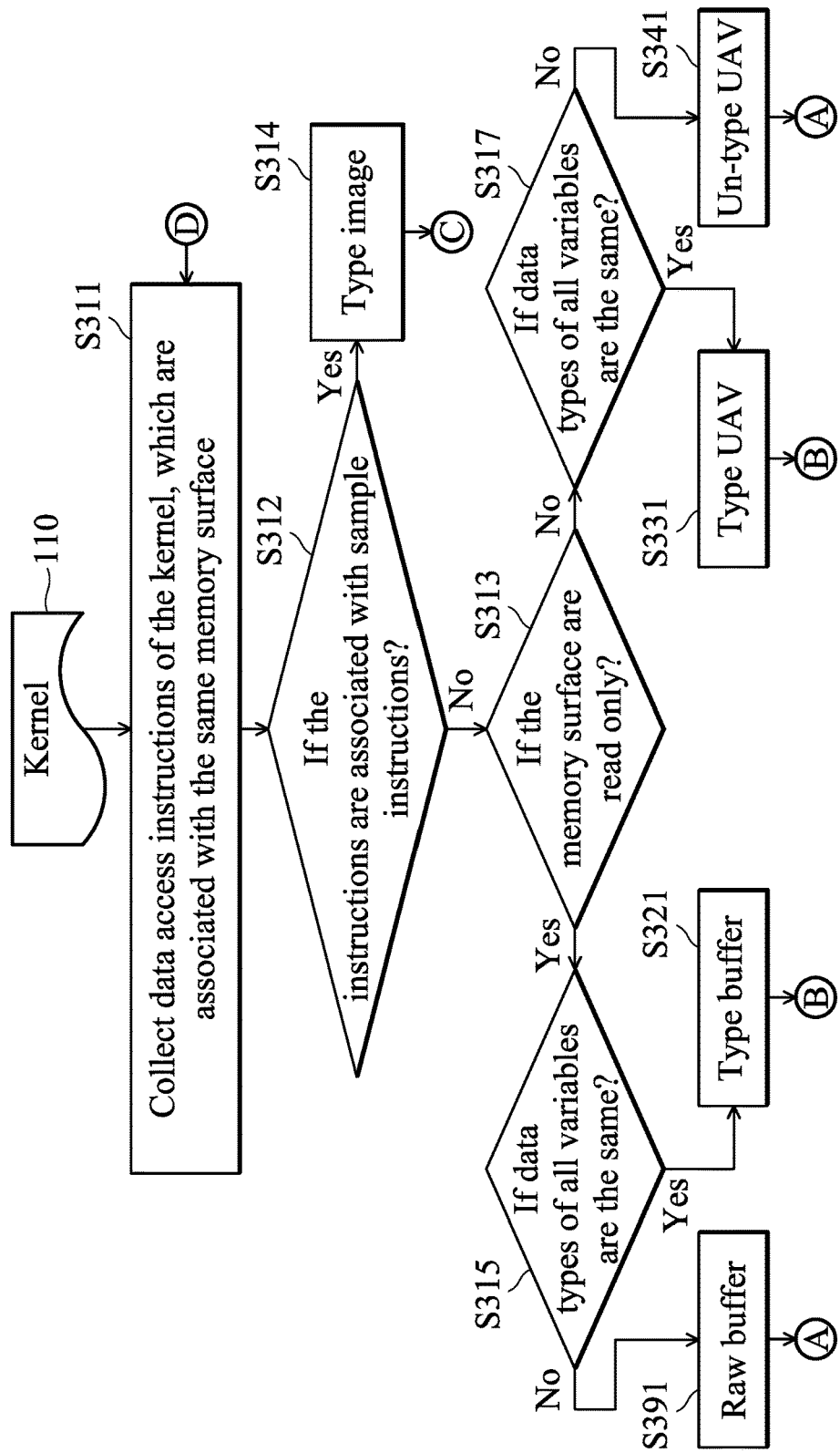
FIGS. 3A to 3C are flowcharts illustrating a method for generating machine code for driving an execution unit according to an embodiment of the invention.
Figure 3B:
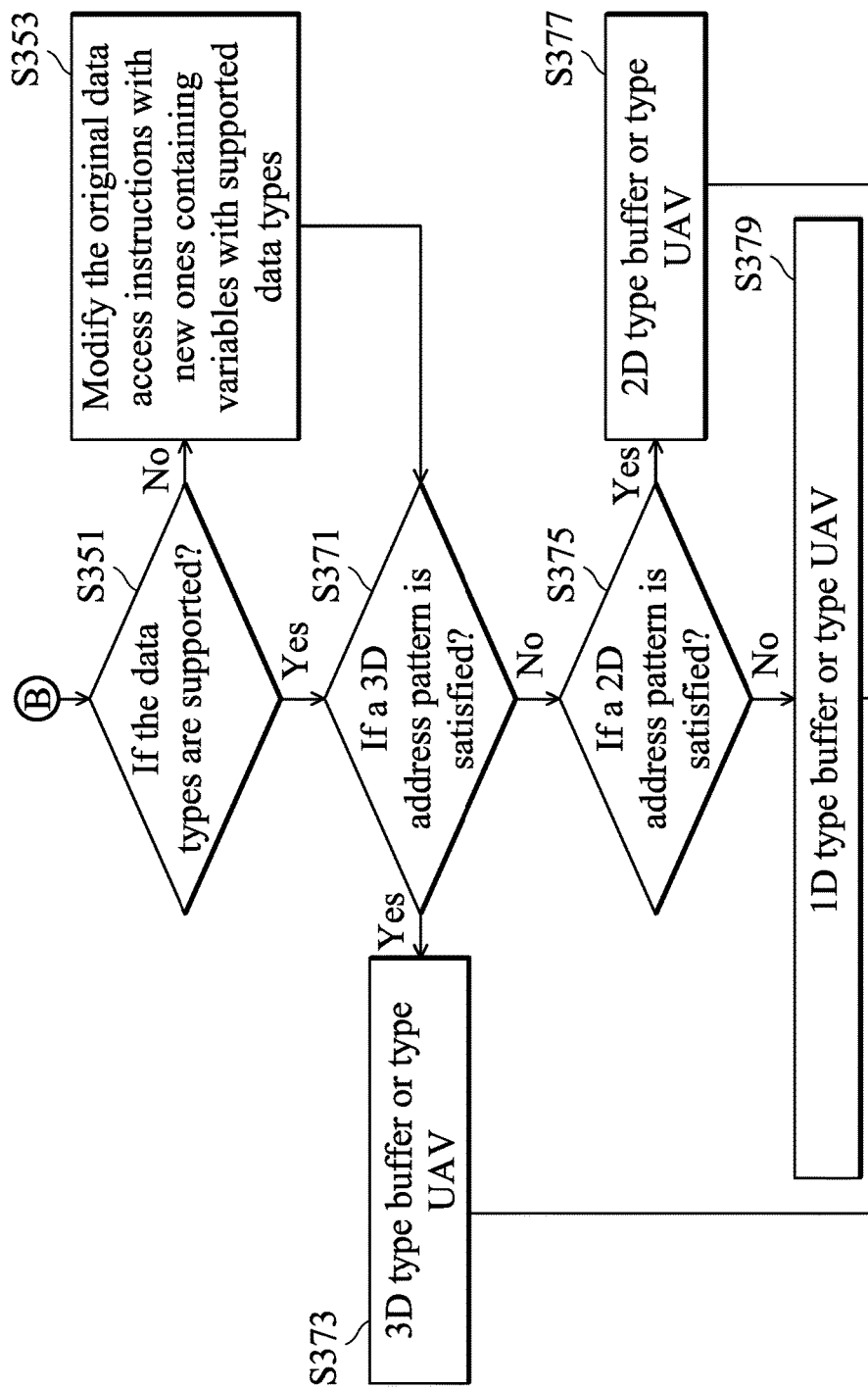
Figure 3C:
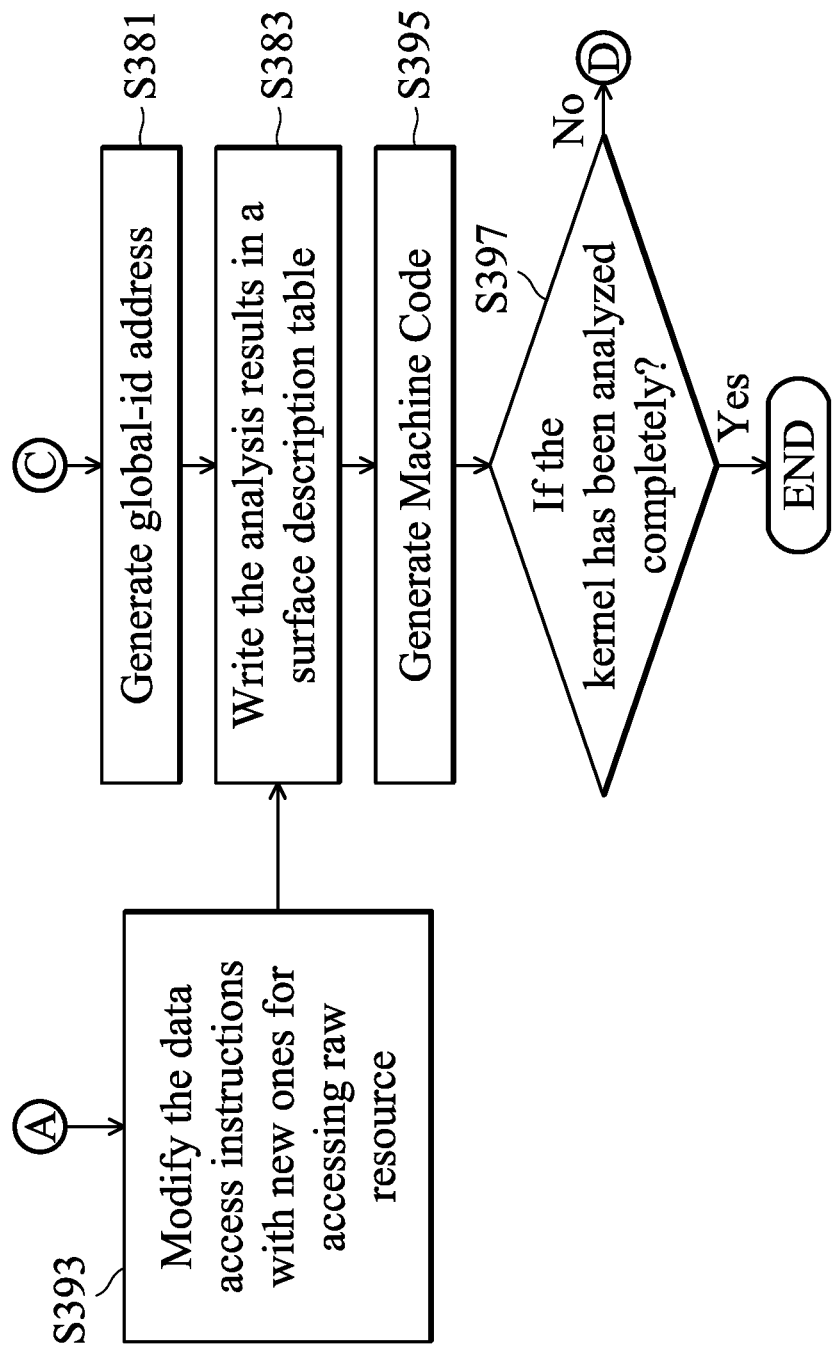

FIGS. 3A to 3C are flowcharts illustrating a method for generating machine code for driving an execution unit according to an embodiment of the invention. The method is performed by the compiler 130. The compiler 130 repeatedly performs a loop for generating machine code 150 of load, store, reduction and sample instructions associated with each memory surface, wherein the memory addresses of the instructions are global-id addresses. Each iteration contains three phases of analysis. In phase one, types of data access instructions associated with the same memory surface are analyzed. In phase two, data types of variables of the data access instructions are analyzed. In phase three, address patterns associated with the data access instructions are analyzed. The compiler 130 modifies original instructions with new ones if required and generates global-id addresses. Finally, the compiler 130 generates machine code 150 according to the original and/or modified instructions with global-id addresses.

Specifically, the compiler 130 collects data access instructions of the kernel 110, which are associated with the same memory surface (step S311). The memory surface may indicate data of a range of memory addresses. In phase one, the compiler 130 determines whether the data access instructions are associated with sample instructions (step S312). If so, the memory surface is determined as a type image (step S314). Otherwise, the compiler 130 further determines whether the memory surface is read only (step S313). In step S313, specifically, when instructions associated with the memory surface are all load instructions, the memory surface is determined as read only. In phase two, the compiler 130 determines whether data types of all variables of the data access instructions are the same (steps S315 and S317). Through the analysis results of phases one and two, the compiler 130 determines the type of this memory surface. Specifically, when the memory surface is read only and data types of all variables of the data access instructions are the same (the "Yes" path of step S315 following the "Yes" path of step S313), the memory surface is determined as a type buffer (step S321). When the memory surface is read only and data types of all variables of the data access instructions are different (the "No" path of step S315 following the "Yes" path of step S313), the memory surface is determined as a raw buffer (step S391). When the memory surface is not read only and data types of all variables of the data access instructions are different (the "No" path of step S317 following the "No" path of step S313), the memory surface is determined as a un-type UAV (Un-order Accessed View) (step S341). When the memory surface is not read only and data types of all variables of the data access instructions are the same (the "Yes" path of step S317 following the "No" path of step S313), the memory surface is determined as a type UAV (step S331). Furthermore, after the memory surface is determined as a type buffer or UAV (step S331 or S321), it is determined whether the data types of the variables of the data access instructions are supported by the EU 200 (step S351). If not, the compiler 130 modifies the original data access instructions with new ones containing variables with supported data types (step S353). For example, a data access instruction contains CHAR16 variables for loading four sets of RGBA pixels at one time, but CHAR16 cannot be supported by the EU 200. The compiler 130 splits the instruction into four data access instructions, each of which contains CHAR4 variables for loading one set of RGBA pixels at one time. After the memory surface is determined as a raw buffer or a un-type UAV (step S391 or S341), the data access instructions are modified with new ones for accessing raw resources (step S393).

In phase three, after the memory surface is determined as a type buffer or UAV (step S331 or S321), the compiler 130 determines whether the address pattern associated with the data access instructions is a global-id based 3D, 2D or 1D address and generates a global-id address accordingly (step S381). The compiler 130 may analyze definition instructions of the kernel 110, which are associated with the memory surface, to determine that the address pattern is a global-id based 3D, 2D or 1D address. Specifically, when the address pattern associated with the data access instructions is a global-id based 3D address (the "Yes" path of step S371), the memory surface is determined as a 3D type buffer or UAV (step S373). For example, when the address calculation associated with the memory surface satisfies "A*W*H+B*W+C", in which W indicates a constant of width, H indicates a constant of height, A, B and C indicate variables varied with a global-id, the compiler 130 determines that the memory surface is a 3D type buffer or UAV. When the address pattern associated with the data access instructions is a global-id based 2D address (the "Yes" path of step S375 following the "No" path of step S371), the memory surface is determined as a 2D type buffer or UAV (step S377). For example, when the address calculation associated with the memory surface satisfies "A*W+B", in which W indicates a constant of width, A and B indicate variables varied with a global-id, the compiler 130 determines that the memory surface is a 2D type buffer or UAV. When the address pattern associated with the data access instructions is a global-id based 1D address (the "No" path of step S375 following the "No" path of step S371), the memory surface is determined as a 1D type buffer or UAV (step S379). For example, when the address calculation associated with the memory surface satisfies "X+A", in which X indicates a constant, and A indicates a variable varied with a global-id, the compiler 130 determines that the memory surface is a 1D type buffer or UAV. Finally, the compiler 130 generates a global-id address according to the aforementioned analysis results (step S381) and writes the analysis results in a surface description table, thereby enabling the driver 170 to set registers of the EU 200 accordingly (step S383). In step S381, the generated global-id address contains information about a global-id and an offset. For example, a 3D global-id address is represented in "global-id+offset(A,B,C)", where global-id indicates a global identifier and offset(A,B,C) indicates a 3D offset. A 2D global-id address is represented in "global-id+offset(A, B)", where global-id indicates a global identifier and offset (A,B) indicates a 2D offset. A 1D global-id address is represented in "global-id+offset(A)", where global-id indicates a global identifier and offset(A) indicates a 1D offset. The surface description table describes a profile for each memory surface, such as the type of the memory surface, the dimension, the width and the height of the global-id address, etc. Finally, the compiler 130 generates the machine code 150 according to the content of the surface description table (step S395). Parallel computing may contain a grid of work items, such as 100×100 work items, and the global-id address is used to identify a designated work item of the grid, considered as a grid index.

For example, after analyzing the aforementioned pseudo code of the exemplary kernel, the compiler 130 generates machine code as follows:

```
SAMPLE_LD R0.xyzw, GID[5][2], t0, s0    // A[address]
SAMPLE_LD R4.xyzw, GID[6][3], t1, s0    // B[address]
FADD.rp3 R4, R0, R4                      // A[address] + B[address]
STT R4.xyzw, GID[0][0], u0               // C[address]= A[address] + B[address]
```

SAMPLE_LD indicates the operator for loading sample data to a TU (Texture Unit) register. R0.xyzw and R4.xyzw indicate registers R0 and R4 respectively and each register stores FLOAT4 data. GID[5][2] is a 2D global-id address indicating a global-id and a 2D offset ($GID_X$+5, $GID_Y$+2). GID[6][3] is a 2D global-id address indicating a global-id and a 2D offset ($GID_X$+6, $GID_Y$+3). t0 and t1 indicate texture indices and s0 indicates a sampling index. The compiler 130 employs the aforementioned global-id based memory address to reduce machine code for calculating the base address of the memory surface. FADD indicates the operator of a float point addition. STT indicates the operator for storing data in a memory surface being a type UAV. GID [0][0] is a 2D global-id address indicating a global-id and a 2D offset ($GID_X$+0, $GID_Y$+0). u0 indicates an UAV index.

Refer back to FIG. 1. The driver 170 when loading and executing the machine code 150 binds a memory surface to a corresponding TU or WBU (Write-Back Unit). When a load, store, reduction or sample operation is performed, the driver 170 directs the CSTC (Computer Shader Task Constructor) 210 to operate. The CSTC 210 is responsible for dispatching work items to the hardware thread 250. Assume each thread can execute up to 32 work items: When the driver 170 informs the CSTC 210 that 100*100 work items need to be processed, the CSTC 210 directs the hardware thread 250 to generate 100*100/32 threads and record a thread identifier with a global-id address for each work item in the buffer 230. The offset calculation module 270 obtains global-id addresses from the buffer 230 according to the thread identifiers, calculates a final offset of a memory according to each global-id address and outputs the final offsets to the TU or WBU. The WB register 290 stores data written by the TU or WBU, thereby enabling the hardware thread 250 to read data from the WB register 290.

Although the embodiments have been described in FIG. 1 as having specific elements, it should be noted that additional elements may be included to achieve better performance without departing from the spirit of the invention. While the process flows described in FIGS. 2, 3A to 3C include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating machine code for driving an execution unit, comprising:
   collecting a plurality of data access instructions of a kernel, which are associated with the same memory surface;
   analyzing an address pattern associated with the data access instructions to generate a global-id address;
   generating machine code comprising the global-id address; and
   determining that the memory surface is a type image and analyzing the address pattern associated with the data access instructions to generate the global-id address when the data access instructions are associated with sample instructions.

2. The method of claim 1, wherein the operation of analyzing an address pattern associated with the data access instructions to generate a global-id address further comprises:

determining whether the address pattern is a 2D (two-dimensional) address based on a global-id; and
if so, generating a 2D global-id address.

3. The method of claim 2, wherein the step for determining whether the address pattern is a 2D (two-dimensional) address based on a global-id further comprises:
determining whether the address pattern is the 2D address based on the global-id by analyzing definition instructions and address calculation instructions associated with the memory surface.

4. The method of claim 3, wherein the operation of determining whether the address pattern is a 2D (two-dimensional) address based on a global-id further comprises:
determining that the address pattern is the 2D address based on the global-id when the address calculation instructions satisfies "A*W+B",
wherein W indicates a constant of width, A and B indicate variables varied with the global-id.

5. The method of claim 3, wherein the 2D global-id address comprises the global-id and a 2D offset.

6. The method of claim 1, wherein the operation of analyzing an address pattern associated with the data access instructions to generate a global-id address further comprises:
determining whether the address pattern is a 1D, 2D or 3D address based on a global-id by analyzing definition instructions and address calculation instructions associated with the memory surface;
generating a 1D global-id address when the address pattern is the 1D address based on the global-id;
generating a 2D global-id address when the address pattern is the 2D address based on the global-id; and
generating a 3D global-id address when the address pattern is the 3D address based on the global-id.

7. The method of claim 1, further comprising:
determining that the memory surface is a type buffer or UAV (Un-order Accessed View) and analyzing the address pattern associated with the data access instructions to generate the global-id address when data types of all variables of the data access instructions are the same.

8. The method of claim 1, further comprising:
when a data type of a variable of any data access instruction is not supported by an EU (Execution Unit), modifying the data access instruction with a new one containing a variable with a data type supported by the EU.

9. The method of claim 8, further comprising:
writing a type of the memory surface and a dimension of the global-id address in a surface description table, thereby enabling a driver when executing the machine code to set a register of the EU.

10. The method of claim 1, wherein the global-id address identifies a designated work item of a grid in parallel computing.

11. The method of claim 1, wherein the memory surface indicates data of a range of memory addresses.

12. The method of claim 1, wherein the EU is an execute unit for a compute shader and/or a 3D graphics shader in pipeline.

* * * * *